US012153701B2

(12) United States Patent
Mishra et al.

(10) Patent No.: US 12,153,701 B2
(45) Date of Patent: Nov. 26, 2024

(54) NLP WORKSPACE COLLABORATIONS

(71) Applicant: INTERNATIONAL BUSINESS MACHINES CORPORATION, Armonk, NY (US)

(72) Inventors: Lawang Mishra, Bangalore (IN); Shruthi Rs Rao, Bangalore (IN); Latha Appanna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 16/558,941

(22) Filed: Sep. 3, 2019

(65) Prior Publication Data
US 2021/0064775 A1 Mar. 4, 2021

(51) Int. Cl.
*G06F 16/245* (2019.01)
*G06F 16/2452* (2019.01)
*G06F 16/248* (2019.01)
*G06F 21/62* (2013.01)
*G06Q 10/10* (2023.01)

(52) U.S. Cl.
CPC ........ *G06F 21/6227* (2013.01); *G06F 16/245* (2019.01); *G06F 16/24522* (2019.01); *G06F 16/248* (2019.01); *G06Q 10/103* (2013.01)

(58) Field of Classification Search
CPC ............... G06F 16/245; G06F 21/6227; G06F 16/24522; G06F 16/248; G06Q 10/103
See application file for complete search history.

(56) References Cited

U.S. PATENT DOCUMENTS 8,464,161 B2\* 6/2013 Giles ............... G06F 21/604
709/204
9,665,662 B1\* 5/2017 Gautam ............ G06F 16/3328
(Continued)

FOREIGN PATENT DOCUMENTS

WO 2019079071 A1 4/2019

OTHER PUBLICATIONS

Mell et al., "The NIST Definition of Cloud Computing", National Institute of Standards and Technology, Special Publication 800-145, Sep. 2011, 7 pages.
(Continued)

*Primary Examiner* — Alicia M Willoughby
(74) *Attorney, Agent, or Firm* — Edward J. Wixted, III (57) ABSTRACT

A method, computer system, and computer program product for generating a collaborative platform for collective database retrieval using natural language processing are provided. The embodiment may include receiving a query in natural language format from a user. The embodiment may also include converting the natural language query to a search query language statement using a natural language processing technique. The embodiment may further include validating the user access rights to queried data. The embodiment may also include rendering a response to the query submitted by the user in a personalized manner. The embodiment may further include creating a temporary table based on the response and the query. The embodiment may also include iterating a plurality of processes of validating and processing a plurality of queries of one or more different users using the created temporary table and based on access rights for each of the one or more different users.

12 Claims, 6 Drawing Sheets

(56) References Cited

U.S. PATENT DOCUMENTS

| | | | |
|---|---|---|---|
| 10,185,748 B1 | 1/2019 | Ayzenshtat | |
| 10,235,533 B1* | 3/2019 | Thoren | G06F 16/252 |
| 11,016,981 B2* | 5/2021 | Dispensa | G06F 7/24 |
| 11,301,502 B1* | 4/2022 | Dijamco | G06F 40/35 |
| 2004/0093323 A1* | 5/2004 | Bluhm | G06F 16/9535 |
| 2005/0289144 A1* | 12/2005 | Dettinger | G06F 21/6227 |
| | | | 707/999.009 |
| 2006/0074913 A1* | 4/2006 | O'Sullivan | G06F 21/6218 |
| | | | 707/999.009 |
| 2006/0101019 A1* | 5/2006 | Nelson | G06F 21/6218 |
| | | | 707/999.009 |
| 2006/0122977 A1* | 6/2006 | Brodhun | G06F 16/288 |
| 2006/0286536 A1* | 12/2006 | Mohler | G09B 5/00 |
| | | | 434/350 |
| 2007/0022111 A1* | 1/2007 | Salam | G06F 16/951 |
| | | | 707/999.005 |
| 2007/0033233 A1* | 2/2007 | Hwang | G06F 16/958 |
| 2007/0174289 A1* | 7/2007 | Utiger | G06F 16/245 |
| 2008/0222108 A1* | 9/2008 | Prahlad | G06Q 10/10 |
| | | | 707/E17.084 |
| 2008/0284597 A1* | 11/2008 | Shah | G06Q 10/00 |
| | | | 340/572.1 |
| 2009/0006358 A1* | 1/2009 | Morris | G06F 16/338 |
| | | | 707/999.005 |
| 2011/0093471 A1* | 4/2011 | Brockway | G06F 21/10 |
| | | | 707/E17.083 |
| 2011/0113050 A1* | 5/2011 | Youn | G06F 21/6218 |
| | | | 707/E17.124 |
| 2011/0265177 A1* | 10/2011 | Sokolan | G06F 16/972 |
| | | | 726/19 |
| 2012/0054223 A1* | 3/2012 | Konik | G06F 16/21 |
| | | | 707/769 |
| 2012/0272159 A1* | 10/2012 | Seth | G06Q 10/10 |
| | | | 715/751 |
| 2012/0317288 A1* | 12/2012 | Campana | G06F 16/958 |
| | | | 709/225 |
| 2013/0173569 A1* | 7/2013 | Pearcy | G06F 16/9038 |
| | | | 707/706 |
| 2013/0275429 A1* | 10/2013 | York | G06F 16/435 |
| | | | 707/E17.002 |
| 2014/0075571 A1* | 3/2014 | Jackson | G06F 16/211 |
| | | | 726/28 |
| 2014/0143501 A1* | 5/2014 | Creamer | G06F 12/0871 |
| | | | 711/136 |
| 2014/0164347 A1* | 6/2014 | Jeh | G06F 16/951 |
| | | | 707/706 |
| 2014/0280174 A1* | 9/2014 | Bitan | G06F 16/904 |
| | | | 707/740 |
| 2014/0358890 A1* | 12/2014 | Chen | G06F 16/9535 |
| | | | 707/710 |
| 2015/0058950 A1* | 2/2015 | Miu | G06Q 20/384 |
| | | | 726/7 |
| 2015/0134648 A1* | 5/2015 | Deshpande | G06F 21/6218 |
| | | | 707/723 |
| 2015/0172294 A1* | 6/2015 | Bittner | G06F 21/6245 |
| | | | 726/4 |
| 2016/0072750 A1* | 3/2016 | Kass | H04L 51/14 |
| | | | 709/206 |
| 2016/0171050 A1* | 6/2016 | Das | G06F 16/90332 |
| | | | 707/718 |
| 2016/0350305 A1* | 12/2016 | Shen | G06F 16/283 |
| 2016/0357756 A1* | 12/2016 | Gelfand | G06F 16/951 |
| 2016/0364460 A1* | 12/2016 | Shuster | G06F 3/0488 |
| 2017/0161320 A1* | 6/2017 | Venkataraman | H04N 21/25833 |
| 2018/0032576 A1 | 2/2018 | Romero | |
| 2018/0330012 A1* | 11/2018 | Hopkins | G06F 16/9538 |
| 2019/0272296 A1* | 9/2019 | Prakash | G06N 7/005 |
| 2019/0286683 A1* | 9/2019 | Kittur | G06F 7/00 |
| 2020/0012745 A1* | 1/2020 | Bain | H04L 9/0822 |
| 2020/0117826 A1* | 4/2020 | Lilly, Jr. | G06F 16/24539 |
| 2020/0226953 A1* | 7/2020 | Anand | G09C 5/00 |
| 2020/0296110 A1* | 9/2020 | Kobel | G06F 16/953 |
| 2020/0334233 A1* | 10/2020 | Lee | G06F 17/16 |
| 2021/0042308 A1* | 2/2021 | Mustafi | G06F 7/00 |
| 2021/0279297 A1* | 9/2021 | Mallin | G06F 21/6218 |

OTHER PUBLICATIONS

Popsql, "Collaborative SQL editor for teams—Download our SQL tool for Mac, Windows, and Linux", https://popsql.com/, accessed Aug. 30, 2019, pp. 1-4.

Teamsql, "Teams & Collaboration", https://teamsql.io/features/teams-collaboration, accessed Aug. 30, 2019, pp. 1-5.

* cited by examiner

NLP WORKSPACE COLLABORATIONS

BACKGROUND

The present invention relates, generally, to the field of computing, and more particularly to collaborative workspace systems utilizing NLP.

A collaborative workspace system may be an organizational unit that emerges at any time when collaboration takes place. Collaborative workspace systems have been developed to create strategies, policies, and structures in order to better organize data, work products, and practices that may promote cooperation among different parties or individuals within an organization, such that organizational goals may be achieved much faster and effectively. The concept of a collaborative workspace system may relate to the idea of virtual workspaces and e-work, which extends the traditional concept of professionals to include any type of knowledge worker who intensively uses the information and communications technology environments and tools in their working practices. Today, a collaborative work system often requires groupware support. A group collaboration technology or groupware may include hardware and software tools that help groups to access and share the information the individuals need to meet, train or teach.

SUMMARY

According to one embodiment, a method, computer system, and computer program product for generating a collaborative platform for collective database retrieval using natural language processing are provided. The embodiment may include receiving a query in natural language format from a user. The embodiment may also include converting the natural language query to a search query language statement using a natural language processing technique. The embodiment may further include validating the user access rights to queried data. The embodiment may also include rendering a response to the query submitted by the user in a personalized manner. The embodiment may further include creating a temporary table based on the response and the query. The embodiment may also include iterating a plurality of processes of validating and processing a plurality of queries of one or more different users using the created temporary table and based on access rights for each of the one or more different users. The embodiment may further include creating a summary of structured database queries from the one or more different users.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to collaborative workspace systems utilizing NLP. The following described exemplary embodiments provide a system, method, and program product to allow users to extract certain information from databases using NLP, convert the NLP operation to a search query language (SQL), and create a pipeline of data search results based on multiple query results. Therefore, the present embodiment has the capacity to improve the technical field of collaborative workspace systems by allowing the second user to use the query result of the first user and perform another query on the first user's query results, and accessing each user's access rights whenever a query is requested by masking the data that a user has no access, thereby combining each user different access rights without overlapping or colluding some other user's data access rights.

As previously described, a collaborative workspace system may be an organizational unit that emerges at any time when collaboration takes place. Collaborative workspace systems have been developed to create strategies, policies, and structures in order to better organize data, work products, and practices that may promote cooperation among different parties or individuals within an organization, such that organizational goals may be achieved much faster and effectively. The concept of a collaborative workspace system may relate to the idea of virtual workspaces and e-work, which extends the traditional concept of professionals to include any type of knowledge worker who intensively uses the information and communications technology environments and tools in their working practices. Today, a collaborative work system often requires groupware support. A group collaboration technology or groupware may include hardware and software tools that help groups to access and share the information the individuals need to meet, train or teach.

Introduction of NLP has opened the doors for users by allowing the users to write natural language queries to extract information from databases, thereby decreasing the user's dependency on more skilled database developer or data scientist. That is, even without having the necessary knowledge of overall database design or SQL, these users are now better equipped to create their own queries. Although such development has increased an organization's overall productivity, there are still certain skill-set constraints which are not yet fully addressed only by NLP. For instance, employees from different units within an organization understand their department's data access process and data design well but they are not exposed or expected to understand how the other department maintains their data because of confidentiality issues. Often times, each individual does not have full access to all the tables, columns or view of certain data due to stringent security or data privacy requirements. Moreover, in a collaborative work setting, data may be transferred in an unencrypted form and may be at a higher risk of a data breach and at risk of compromising personal data if sufficient measures are not taken to share said data very securely. As such, it may be advantageous to, among other things, implement a system capable of allowing users to connect to a common database schema with each user's different access rights, collaborating on a project by forming pipeline of each user's queries and updates, and ensuring at each step of processing the queries by hiding or masking the data to which a user has no access.

According to one embodiment, the present invention may allow users to connect to a common database to work collaboratively on a project and validate each user's access rights. In at least one other embodiment, the present invention may also create a pipeline of user queries by running one query at a time and validating each user's access rights repeatedly as each query is processed. The present invention may further generate query processing procedures or functions based on the generated pipeline and save in a database for the future.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for creating a collaborative platform for collective natural language querying (NLQ) based database retrieval based on the formulation of structured database queries from a series of unstructured multi-user queries using NLP.

Figure 1:
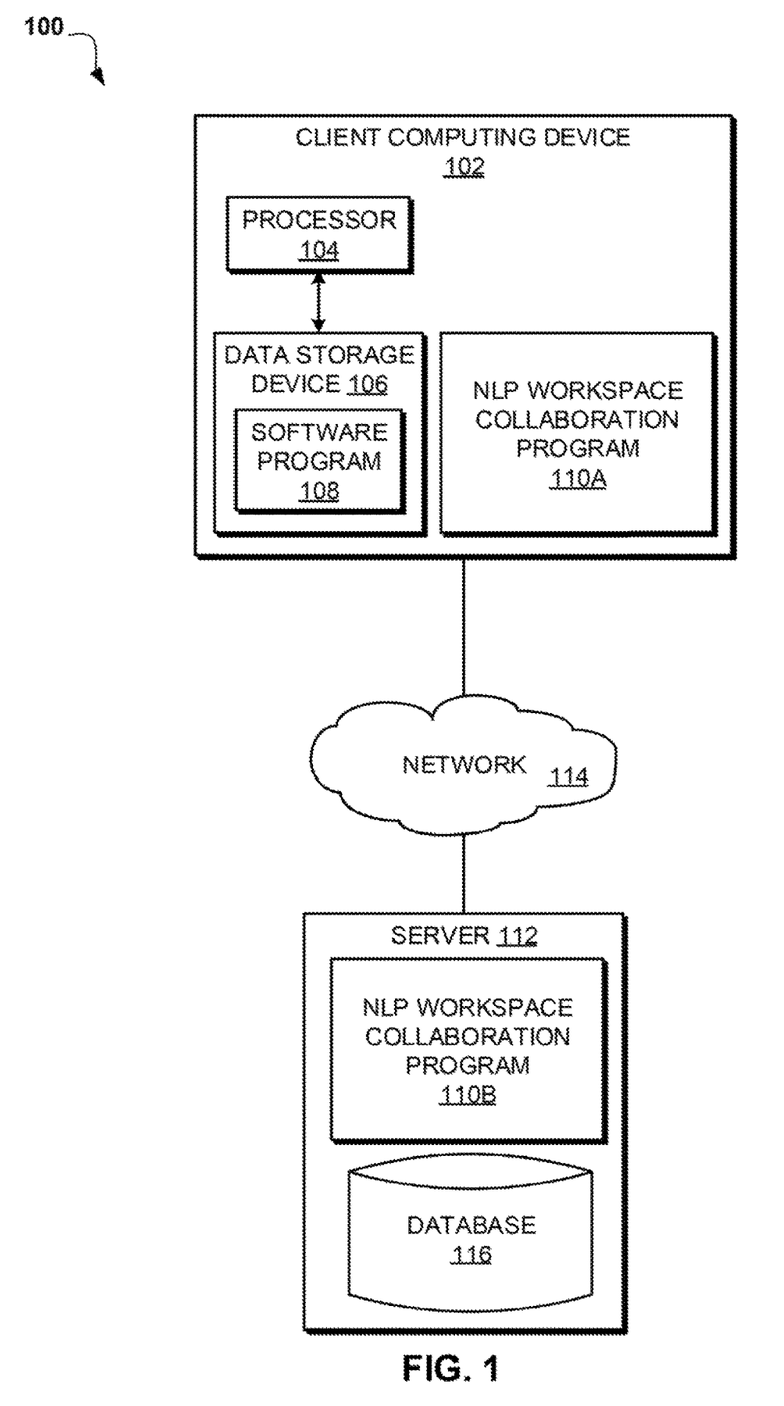
FIG. 1 illustrates an exemplary networked computer environment according to at least one embodiment.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a NLP workspace collaboration program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a NLP workspace collaboration program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the NLP workspace collaboration program 110A, 110B may be a program capable of creating a collaborative work platform for collective database retrieval using NLP when different users have different access rights to one or more databases. The NLP workspace collaboration process is explained in further detail below with respect to FIG. 2.

Figure 2:
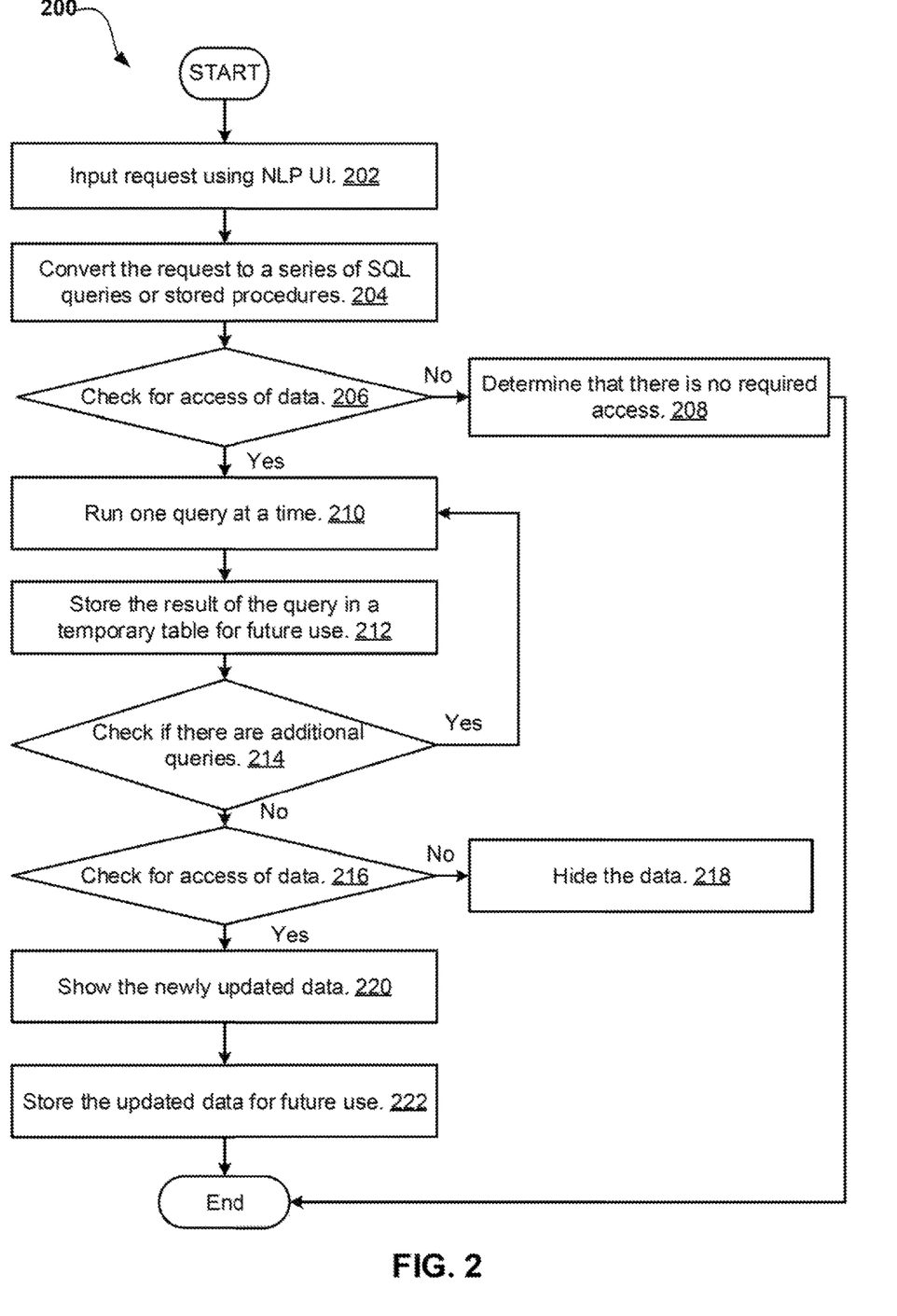
FIG. 2 is an operational flowchart illustrating an NLP workspace collaboration process according to at least one embodiment.

Referring to FIG. 2, an operational flowchart illustrating an NLP workspace collaboration process 200 is depicted according to at least one embodiment. At 202, the NLP workspace collaboration program 110A, 110B receives an input request from one or more users using NLP via user interfaces. According to one embodiment, the NLP workspace collaboration program 110A, 110B may transmit invitations to one or more users to collaborate to work on a common goal. As all the invited collaborators accept the invite, the NLP workspace collaboration program 110A, 110B may allow the users to log into a collaboration console connected to the server 112, which may interact with the software program 108. Then, the NLP workspace collaboration program 110A, 110B may receive a user request in natural language form for certain data from a database.

At 204, the NLP workspace collaboration program 110A, 110B converts the input request to a series of SQL queries or stored procedures. According to one embodiment, the NLP workspace collaboration program 110A, 110B may utilize a known backend API to convert those input requests to SQL queries. In one other embodiment, the NLP workspace collaboration program 110A, 110B may also convert user inputs to previously-stored SQL statements or organization-specific procedures used to search for certain data from a private database.

At 206, the NLP workspace collaboration program 110A, 110B checks for access to data. According to one embodiment, the NLP workspace collaboration program 110A, 110B may check whenever user input is received using NLP. For example, if a user would like to access certain data pertaining to salary information for all employees of a company, the NLP workspace collaboration program 110A, 110B may validate the user's access right to the information when the user requests such access. If the NLP workspace collaboration program 110A, 110B determines that the user has an appropriate access right (step 206, "YES" branch), the NLP workspace collaboration program 110A, 110B may continue to step 210 to run one query at a time. If the NLP workspace collaboration program 110A, 110B determines that access right is not found (step 206, "NO" branch), then the NLP workspace collaboration program 110A, 110B may proceed to step 208 to determine that the user has no required access right.

At 208, the NLP workspace collaboration program 110A, 110B determines that there is no required access. According to one embodiment, the NLP workspace collaboration program 110A, 110B may determine that there are no required access rights when a user only has partial access right to certain data in a database. For example, if a user would like to access entire employee salary information but the user only has access to salary information pertaining to a certain group of employees, the NLP workspace collaboration program 110A, 110B may determine that the user has no required access right to such information when working collaboratively on a project with other users from different units with different roles or responsibilities. In at least one other embodiment, the NLP workspace collaboration program 110A, 110B may validate a user's access right to certain data and request a full access right when the NLP workspace collaboration program 110A, 110B determines that the user's full access right is necessary to carry out a collaborative project.

At 210, the NLP workspace collaboration program 110A, 110B runs one query at a time. According to one embodiment, the NLP workspace collaboration program 110A, 110B may validate a user's access right whenever the user runs a query using NLP. In at least one other embodiment, the NLP workspace collaboration program 110A, 110B may segment a long query and regard it as one or more queries to run and store the result of each query as an individual query result for future reference.

At 212, the NLP workspace collaboration program 110A, 110B stores the result of the query in a temporary table for future use. According to one embodiment, the NLP workspace collaboration program 110A, 110B may build a pipeline by storing each query result at a time until a collaboration administrator or preconfigured business logic determines that the pipeline is complete. For example, the NLP workspace collaboration program 110A, 110B may process each query and store each query result in a table that is created to be used only for the current project, and as the table collects and stores more query results, the table itself may be utilized as a complete guideline or procedure for the next available project. The NLP workspace collaboration program 110A, 110B may store the temporary table in the database 116. In one other embodiment, the NLP workspace collaboration program 110A, 110B may save both NLP and SQL statements along with the corresponding query results in separate columns in a table.

At 214, the NLP workspace collaboration program 110A, 110B may check if there are additional queries. According to one embodiment, the NLP workspace collaboration program 110A, 110B may continue to monitor any other users' additional queries need to be processed. For example, a user from a different department working on the same project would like to retrieve a different set of data from the same database. If the NLP workspace collaboration program 110A, 110B determines that there is an additional query (step 214, "Yes" branch), the NLP workspace collaboration program 110A, 110B returns to step 210 to run one query at a time again. If the NLP workspace collaboration program 110A, 110B determines that there is no additional queries (step 214, "No" branch), the NLP workspace collaboration program 110A, 110B continues to step 216 to check for access of data.

At 216, the NLP workspace collaboration program 110A, 110B checks for access to data. According to one embodiment, the NLP workspace collaboration program 110A, 110B may check the access right to certain data whenever a user requests a different query to retrieve data from a database. If the NLP workspace collaboration program 110A, 110B determines that there is no access right to data (step 216 "Yes" branch), the NLP workspace collaboration program 110A, 110B continues to step 220 to show the newly updated data. If the NLP workspace collaboration program 110A, 110B determines that there is no access right to said data (step 216, "No" branch), the NLP workspace collaboration program 110A, 110B continues to step 218 to hide the data.

At 218, the NLP workspace collaboration program 110A, 110B hides the data to which a user has no access. According to one embodiment, the NLP workspace collaboration program 110A, 110B hide or mask an appropriate portion of the dataset depending on each of multiple users' different level of access rights. For example, if a user from an accounting department has access to certain data to which another user from an HR department has no access. Such data may be masked or hidden by the NLP workspace collaboration program 110A, 110B to the user from the HR department and may be disclosed to the user form the accounting department. The NLP workspace collaboration program 110A, 110B may update the temporary table created in step 212 with information that certain data is masked or hidden to a particular user.

At 220, the NLP workspace collaboration program 110A, 110B shows the newly updated data. According to one embodiment, the NLP workspace collaboration program 110A, 110B may distribute the newly updated data with information as to which specific information is masked or hidden to some users or participants of a collaborative work project. In one other embodiment, participants who have access to certain tables that have relevant data in query results may be able to access the relevant data but others who do not have the same access rights may not access the same data. For example, an individual who has write and/or read permission on all data or tables that may be used in a particular query may have the right to access the data contained in the query result and other participants may not see the same data as such data may be masked or hidden by the NLP workspace collaboration program 110A, 110B.

At 222, the NLP workspace collaboration program 110A, 110B stores the updated data for future use. According to one embodiment, the NLP workspace collaboration program 110A, 110B may store the whole pipeline of queries, results and actions taken summarized in natural language as a function or procedure for future reference, such that organizations or companies may reuse the whole query results as a data set or use as reference for any follow-up projects.

Figure 3:
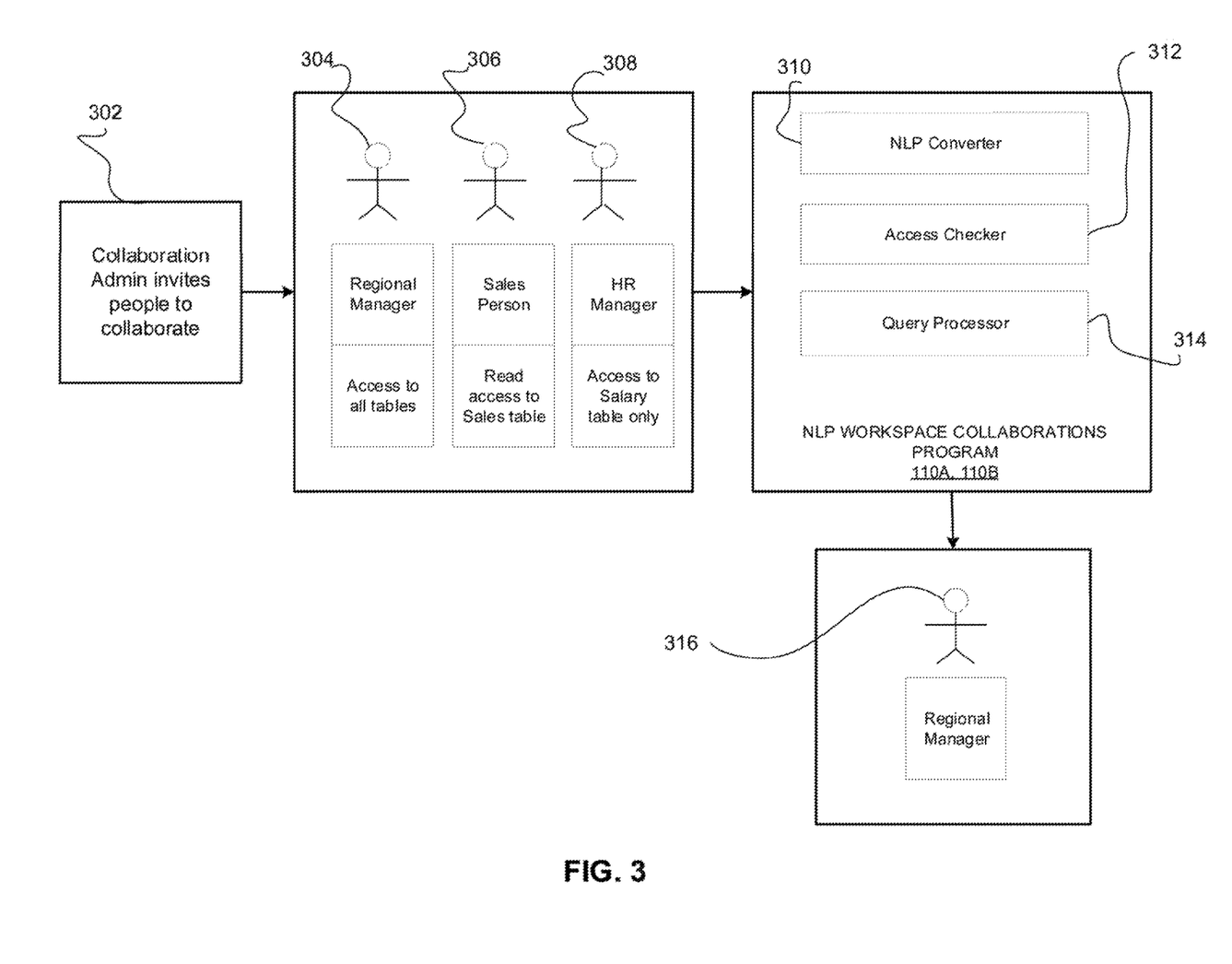
FIG. 3 is an exemplary diagram depicting an NLP workspace collaboration process according to at least one embodiment.

Referring now to FIG. 3, an exemplary diagram depicting an NLP workspace collaboration process is depicted according to at least one embodiment. According to one embodiment, the NLP workspace collaboration program 110A, 110B may send collaboration invitations 302 to multiple users, such as Regional Manager 304, Sales Person 306 and HR Manager 308, to collaborate on a project. For example, Regional Manager 304 has access to all tables, Sales Person has read-only access to sales figures related table, and HR Manager 308 has only access to the salary table. The NLP workspace collaboration program 110A, 110B may include an NLP converter 310, an access checker 312 and a query processor 314. The NLP converter may convert each query that each user may enter via a user interface to a SQL statement. For example, if Regional Manager 304 enters "employees with sales record which exceeds $100,000", the NLP converter may change the natural language query to a SQL statement. The access checker may validate Regional Manager 304's access right to such records and once the access checker confirms Regional Manager 304's access right, the query processor 314 may run said query and stores the query results in a temporary table such that Sales Person 306 and HR Manager 308's next queries may be run on the query result of Regional Manager 304's query result. For examples, the first query may provide the results "Employee A, Employee B, and Employee C exceeded the sales record of $100,000". The NLP workspace collaboration program 110A, 110B may allow Sales Person 306 or HR Manager 308 to enter a query such as "What are the salaries of employees that exceeded the sales record of $100,000" and the NLP workspace collaboration program 110A, 110B does not need to go through the process of finding such employees as the temporary table already contains such information from the first query. the NLP workspace collaboration program 110A, 110B will build a complete pipeline consisting of queries and query results necessary for the entire project and once the NLP workspace collaboration program 110A, 110B determines that the pipeline is complete, then the NLP workspace collaboration program 110A, 110B may send the finalized table or data summary to Regional Manager 304 who, in this example, has full access to all tables. In other example, even if Regional Manager 304 has access to all the data, Regional Manager 304 may need assistance from a technician from a technical department when Regional Manager needs to complete a certain task. As such data may be sensitive, Regional Manager 304 may not be able to grant access to the technician but Regional Manager 304 may share the data using the NLP workspace collaboration program 110A, 110B such that the technician may work with Regional Manager 304 on the sensitive data without having access right to such data.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the NLP workspace collaboration program 110A, 110B may determine and change the scope of access rights of each user along the way as the collaborative work on project progress.

Figure 4:
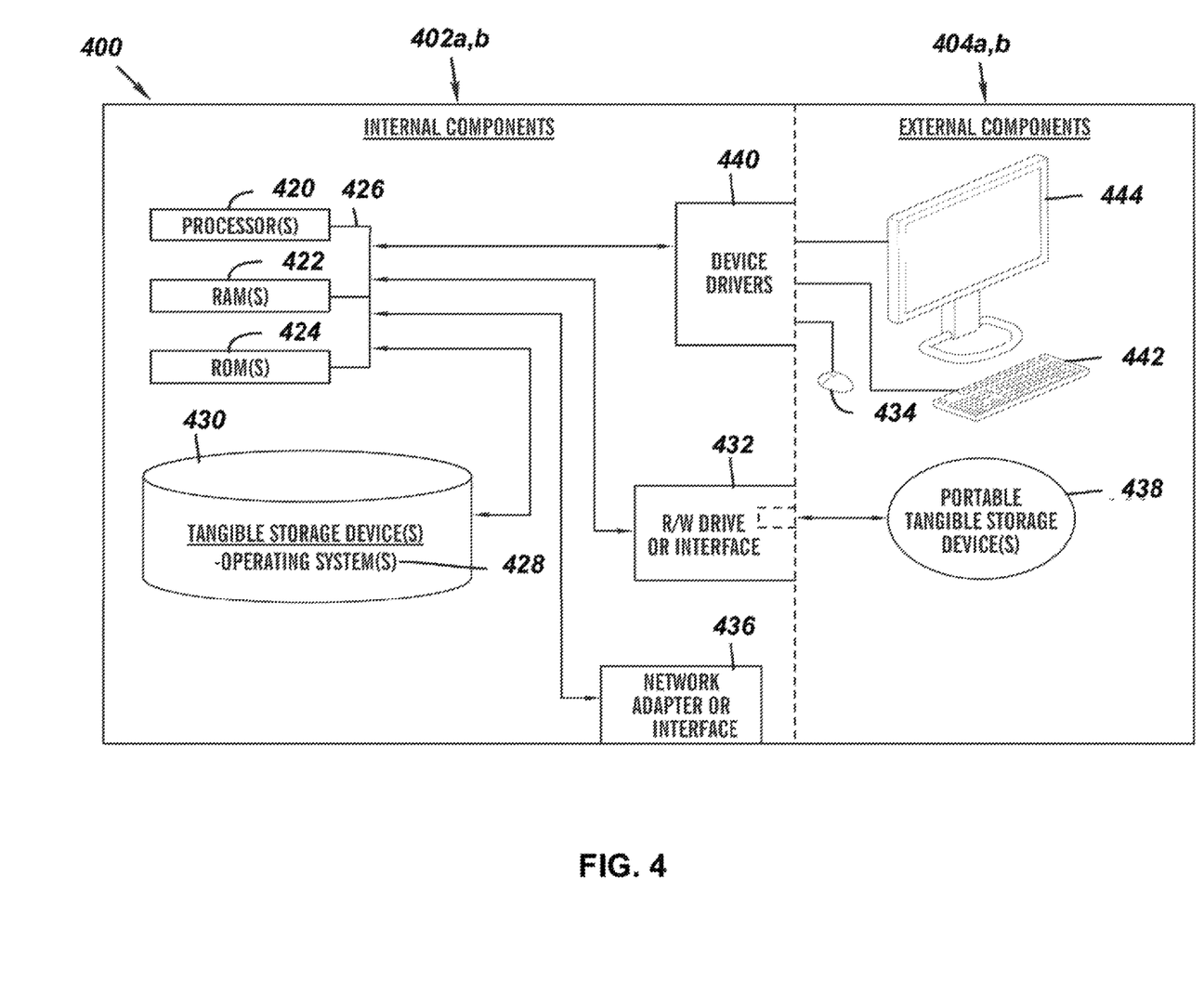
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the NLP workspace collaboration program 110A in the client computing device 102 and the NLP workspace collaboration program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the NLP workspace collaboration program 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the NLP workspace collaboration program 110A in the client computing device 102 and the NLP workspace collaboration program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the NLP workspace collaboration program 110A in the client computing device 102 and the NLP workspace collaboration program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
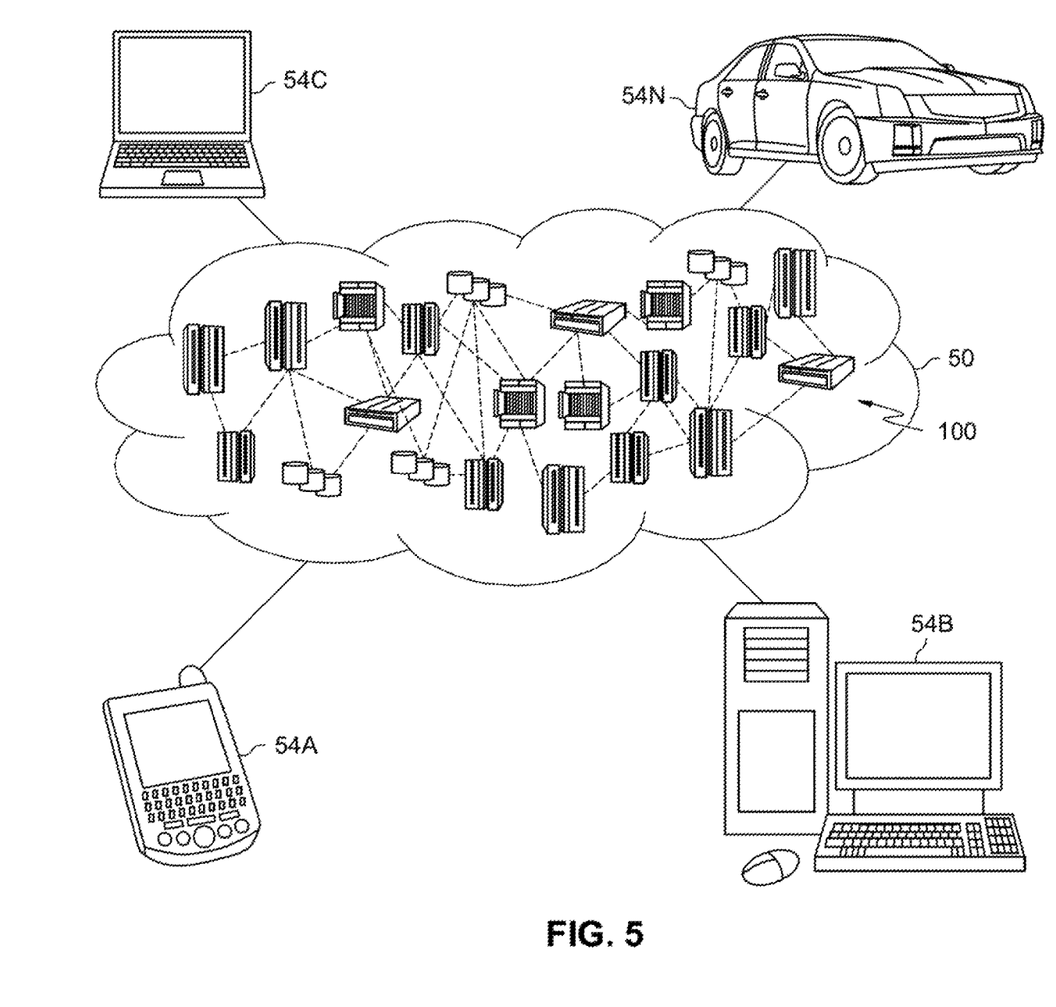
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
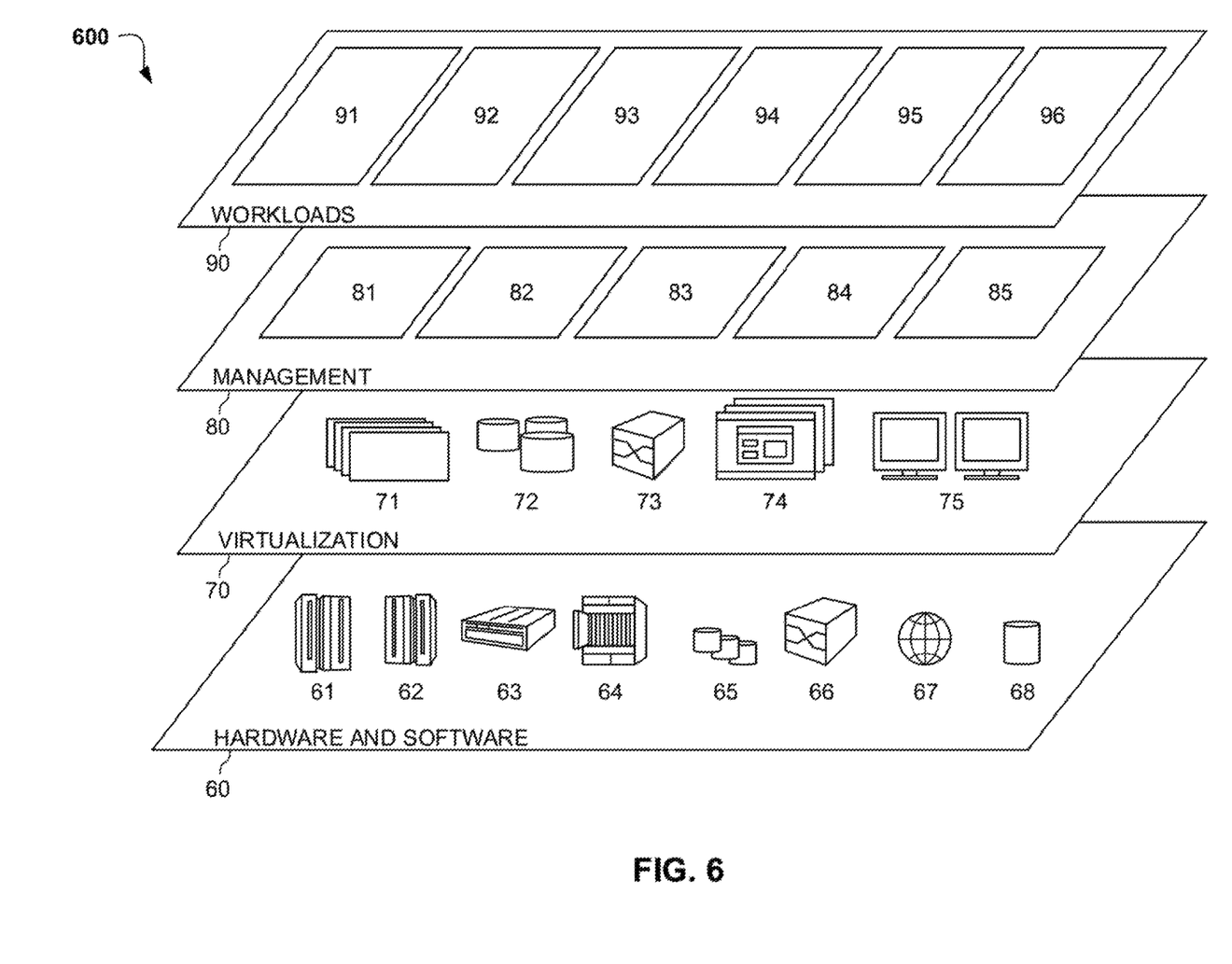
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLP workspace collaboration 96. NLP workspace collaboration 96 may relate to creating a collaborative platform for collective natural language querying (NLQ) based database retrieval.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a first query of a private database in natural language format from a first user from among a plurality of users assigned to a project, wherein the first query requires access to a table not accessible by a second user;
converting the natural language query to a search query language (SQL) statement using a natural language processing technique, wherein:
the search query is converted to one or more previously-stored SQL statements for searching for certain data from the private database; and
the search query is segmented and stored as one or more individual queries for future reference;
validating user access rights to queried data, the access rights based on an assigned job role of each respective user, wherein a request is made for full access to the queried data for the first user having only partial access to the queried data based on a determination that full access is necessary for the first user;
rendering a response to the query submitted by the first user in a personalized manner;
creating a temporary table for the project based on the response and the query, wherein:
the temporary table includes results of the first query and information that certain data is hidden from the second user from among the plurality of users; and
the information that the certain data is hidden from the second user is distributed to one or more other users from among the plurality of users;
receiving a second query of the private database by the second user of the project, wherein:
the second query is different than the first query; and
the second user has different access to at least one aspect of data requested by the first query;
processing the second query to return a subset of the results of the first query using the results of the first query from the temporary table and based on access rights for the second user; and
creating a summary of structured database queries from the one or more different users.

2. The method of claim 1, further comprising:
validating each respective users' data access rights when each query is processed.

3. The method of claim 1, further comprising:
responsive to rendering a response to the query submitted by the first user in the personalized manner, hiding data to which the first user has no access.

4. The method of claim 1, further comprising:
storing the processed query, query results, and actions taken in connection with the query results in the temporary table.

5. A computer system comprising:
a processor set;
a set of one or more computer-readable storage media; and
program instructions, collectively stored in the set of one or more storage media, for causing the processor set to perform the following computer operations:
receive a first query of a private database in natural language format from a first user from among a plurality of users assigned to a project, wherein the first query requires access to a table not accessible by a second user;
convert the natural language query to a search query language (SQL) statement using a natural language processing technique, wherein:
the search query is converted to one or more previously-stored SQL statements for searching for certain data from the private database; and
the search query is segmented and stored as one or more individual queries for future reference;
validate user access rights to queried data, the access rights based on an assigned job role of each respective user, wherein a request is made for full access to the queried data for the first user having only partial access to the queried data based on a determination that full access is necessary for the first user;
render a response to the query submitted by the first user in a personalized manner;
create a temporary table for the project based on the response and the query, wherein:
the temporary table includes results of the first query and information that certain data is hidden from the second user from among the plurality of users; and
the information that the certain data is hidden from the second user is distributed to one or more other users from among the plurality of users;

receive a second query of the private database by the second user of the project, wherein:
    the second query is different than the first query; and
    the second user has different access to at least one aspect of data requested by the first query;
process the second query to return a subset of the results of the first query using the results of the first query from the temporary table and based on access rights for the second user; and
create a summary of structured database queries from the one or more different users.

6. The computer system of claim 5, further comprising:
program instructions, collectively stored in the set of one or more storage media, for causing the processor set to perform the following computer operation:
    validate each respective users' data access rights when each query is processed.

7. The computer system of claim 5, further comprising:
program instructions, collectively stored in the set of one or more storage media, for causing the processor set to perform the following computer operation:
    responsive to rendering a response to the query submitted by the first user in the personalized manner, hide data to which the first user has no access.

8. The computer system of claim 5, further comprising:
program instructions, collectively stored in the set of one or more storage media, for causing the processor set to perform the following computer operation:
    store the processed query, query results, and actions taken in connection with the query results in the temporary table.

9. A computer program product comprising:
a set of one or more computer-readable storage media;
program instructions, collectively stored in the set of one or more storage media, for causing a processor set to perform the following computer operations:
    receive a first query of a private database in natural language format from a first user from among a plurality of users assigned to a project, wherein the first query requires access to a table not accessible by a second user;
    convert the natural language query to a search query language (SQL) statement using a natural language processing technique, wherein:
        the search query is converted to one or more previously-stored SQL statements for searching for certain data from the private database; and
        the search query is segmented and stored as one or more individual queries for future reference;
    validate user access rights to queried data, the access rights based on an assigned job role of each respective user, wherein a request is made for full access to the queried data for the first user having only partial access to the queried data based on a determination that full access is necessary for the first user;
    render a response to the query submitted by the first user in a personalized manner;
    create a temporary table for the project based on the response and the query, wherein:
        the temporary table includes results of the first query and information that certain data is hidden from the second user from among the plurality of users; and
        the information that the certain data is hidden from the second user is distributed to one or more other users from among the plurality of users;
    receive a second query of the private database by the second user of the project, wherein:
        the second query is different than the first query; and
        the second user has different access to at least one aspect of data requested by the first query;
    process the second query to return a subset of the results of the first query using the results of the first query from the temporary table and based on access rights for the second user; and
    create a summary of structured database queries from the one or more different users.

10. The computer program product of claim 9, further comprising:
program instructions, collectively stored in the set of one or more storage media, for causing the processor set to perform the following computer operation:
    validate each respective users' data access rights when each query is processed.

11. The computer program product of claim 9, further comprising:
program instructions, collectively stored in the set of one or more storage media, for causing the processor set to perform the following computer operation:
    responsive to rendering a response to the query submitted by the first user in the personalized manner, hide data to which the first user has no access.

12. The computer program product of claim 9, further comprising:
program instructions, collectively stored in the set of one or more storage media, for causing the processor set to perform the following computer operation:
    store the processed query, query results, and actions taken in connection with the query results in the temporary table.

* * * * *